Jan. 1, 1929.

P. R. VITTE 1,697,334

BURNER FOR GLASS FURNACES

Filed Oct. 22, 1924

Inventor
Paul R. Vitte

Patented Jan. 1, 1929.

1,697,334

UNITED STATES PATENT OFFICE.

PAUL R. VITTE, OF CHICAGO, ILLINOIS.

BURNER FOR GLASS FURNACES.

Application filed October 22, 1924. Serial No. 745,152.

The present invention relates to improvements in burners, particularly adapted for use with glass furnaces.

Heretofore, it has been customary to heat the body of glass flowing from a melting furnace to the discharge outlet by burners adapted only for burning natural gas.

Attempts have been made to provide a burner for this purpose, which would permit of oil being employed as the combustible medium, but such burners have not, in practice, been found satisfactory.

Ordinary oil burners which spray the burning oil directly upon the flow of glass are found to produce bubbles or "blisters" in the glass body and the only burners adapted for directing a flame directly upon the glass, that have heretofore proven satisfactory, are those which are designed for for burning natural gas.

The object of the present invention is to provide a simple, durable and inexpensive burner in which a mixture of liquid hydrocarbon and air is employed, and which will produce a flame that will not have any bad effect upon the body of glass and will effectively maintain the same in the desired fluid condition.

With this and other objects in view the invention consists of the improved burner which will be hereinafter more particularly pointed out and described.

In the accompanying drawings:—

Figure 1:
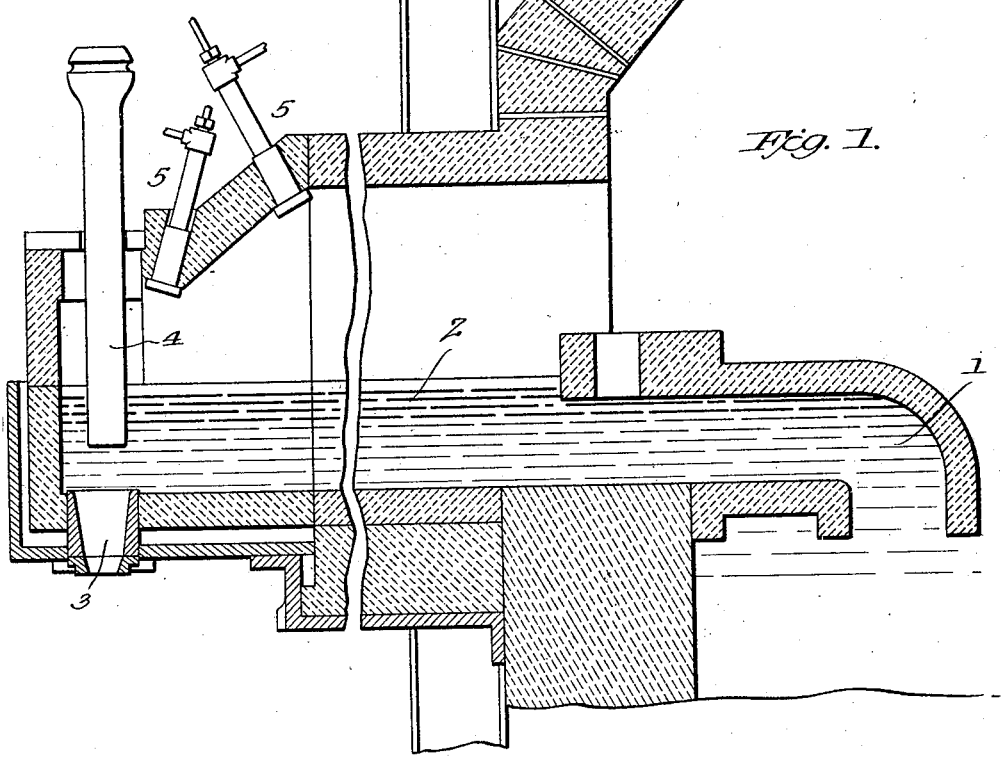
Fig. 1 is a more or less conventional, sectional, view of a portion of a glass furnace provided with burners constructed in accordance with the present invention.
Figure 2:
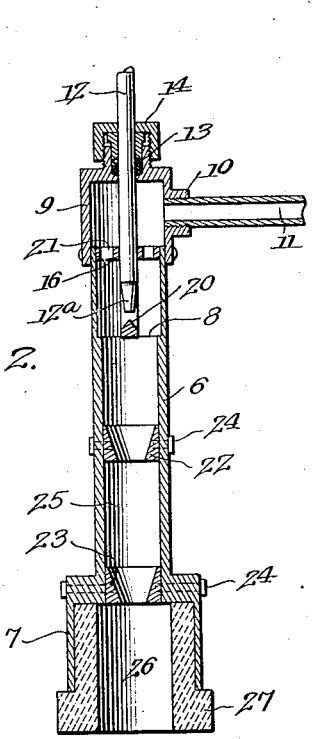
Fig. 2 is a longitudinal section through the improved burner, detached from the furnace.
Figure 3:
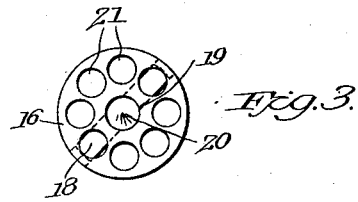
Figs. 3 and 4 are, respectively, a plan and elevation of a portion of the mixing devices of the improved burner, removed from the burner casing.
Figure 4:
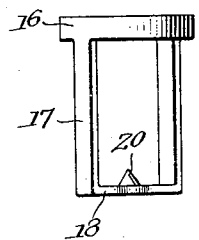

In the drawings, 1 designates a portion of the body of a glass melting furnace, and 2 a section of the laterally extending delivery or discharge portion of such furnace, which is provided with a suitable outlet 3 adapted to be closed by a plunger 4. The parts referred to are merely shown conventionally, as the improved burner may be employed with furnaces of various design.

As usual, a plurality of burners 5 are provided in the walls of the furnace, said burners being positioned so that the flame therefrom will be directed onto the outflowing body of glass in the section 2.

The improved burner comprises a main elongated tubular section 6, which, at one end, is expanded or provided with a section 7, that is of greater internal diameter than the body of the casing and, adjacent its other end said casing is provided with an interior annular shoulder 8.

To the smaller end of the tubular casing 6 is secured a head 9 provided with a lateral interiorly threaded boss 10, with which communicates a pipe 11, by which compressed air is supplied to the body of the burner. A hydrocarbon supply pipe 12 extends through an aperture formed in the end of the head 9, a suitable stuffing box 13 being provided about said pipe and over this is fitted a cap 14 forming an airtight closure about the pipe 12. The end of the hydrocarbon supply pipe 12 within the burner casing is tapered to provide a nozzle section $12^a$, from which the hydrocarbon will be discharged in a relatively small stream.

Within the tube 6 is arranged a mixing device comprising an apertured disk 16 supported by a frame including diametrically opposite longitudinal members 17 connected by a transverse member 18. The member 18 rests upon the inwardly directed annular shoulder 8 of the burner casing 6, and the hydrocarbon supply pipe 12 extends through a central aperture 19 in the disk 16.

Mounted on the transverse bar 18, in alignment with the bore of the pipe 12, is a deflecting cone 20, against which the stream of hydrocarbon issuing from the pipe 12 is directed, and by which such liquid is caused to spray outward into the paths of the streams of air that pass through the apertures 21 in the disk 16. It will be seen that by this particular arrangement the stream of liquid hydrocarbon is formed into a spray and projected directly into the paths of the streams of air passing through the plate 16.

To further effectively mix the particles of air and hydrocarbon, the burner is provided with a plurality of interior sleeves, each having the passage therethrough gradually reduced in diameter toward the outlet end of the burner.

In the embodiment of the invention illustrated, two of such sleeves 22, 23, are provided, being shown as attached to the casing body 6 by suitable screws 24.

As the mixture of air and hydrocarbon passes through the sleeve 22, it will be contracted in volume, and will then be allowed to expand in the chamber 25, this contraction and expansion being repeated as the mixture passes through the second sleeve 23 into the chamber adjacent the burner outlet.

To protect the metal body of the burner casing from the great heat generated when it is in use, the portion 7 of such casing is provided with an interior lining of fire-clay or other refractory material, the outer end of which is increased in thickness so that it extends laterally across the edge or end of the burner casing and provides a section 27 that, as shown in Fig. 1, will contact with the walls of the furnace and thus completely enclose the metal body of the burner.

From the foregoing description and the drawing, it will be seen that as the compressed air enters the chamber in the head 9 from the pipe 11, it will, in passing through the openings 21 in the disks 16, be divided into a series of relatively small streams, and the liquid hydrocarbon entering the burner through the pipe 12 will, by the cone 20, be sprayed into the paths of said streams of air. This will produce a very intimate mixture of the air and hydrocarbon particles in the chamber above or outside of the sleeve 22 and in passing through said sleeve and the other sleeve 23, such mixture will be made more intimate so that, at the burner outlet, there will be produced a highly combustible vapor.

Experience has shown that with ordinary kerosene as the liquid hydrocarbon a burner of the construction described will produce a vapor that will not produce any appreciable carbon when ignited, and a flame which will not have any bad effect upon the body of glass against which it is directed.

It will be appreciated that the very simple construction of the burner is a point of decided advantage, as it can be manufactured very cheaply, comprises a minimum number of parts and is very durable. The body of the burner and the sleeves 22, 23, may be made of steel, the refractory lining or body 26—27 about the outlet and acting to effectively protect the metal body from being injured by the intense heat generated by the burning vapor.

It is, of course, to be understood that the proportions of the parts may be varied, if desired, and that the drawing is intended to be illustrative rather than restrictive of the invention.

Having thus described the invention, what is claimed is:—

1. In a device of the character described, an elongated casing having compressed air inlet at one end, an oil pipe entering said casing at the same end and projecting therein, a mixing device having a perforated portion supported on the casing and projecting arms carrying a spray member, said spray member being in direct alignment with said oil pipe, and said depending arms being arranged flush with the wall of the casing, whereby compressed air will pass through the perforations of the mixing device and meet an unbroken spray of oil from the spray member, means supported by the casing for concentrating and expanding the mixture, the casing at its outer end being of greater diameter than at any portion of its length, and a refractory lining within said enlarged portion.

2. In a device of the character described, an elongated casing having compressed air inlet at one end, an oil pipe entering said casing at the same end and projecting therein, a mixing device having a perforated portion supported on the casing and projecting arms carrying a spray member, said spray member being in direct alignment with said oil pipe, and said depending arms being arranged flush with the wall of the casing, whereby compressed air will pass through the perforations of the mixing device and meet an unbroken spray of oil from the spray member, means supported by the casing for concentrating and expanding the mixture, the casing at its outer end being of greater diameter than at any portion of its length.

In testimony whereof I have hereunto set my hand.

PAUL R. VITTE.